Jan. 26, 1965    C. J. DEMRICK    3,167,358
WHEEL COVER
Filed April 13, 1964    6 Sheets-Sheet 1
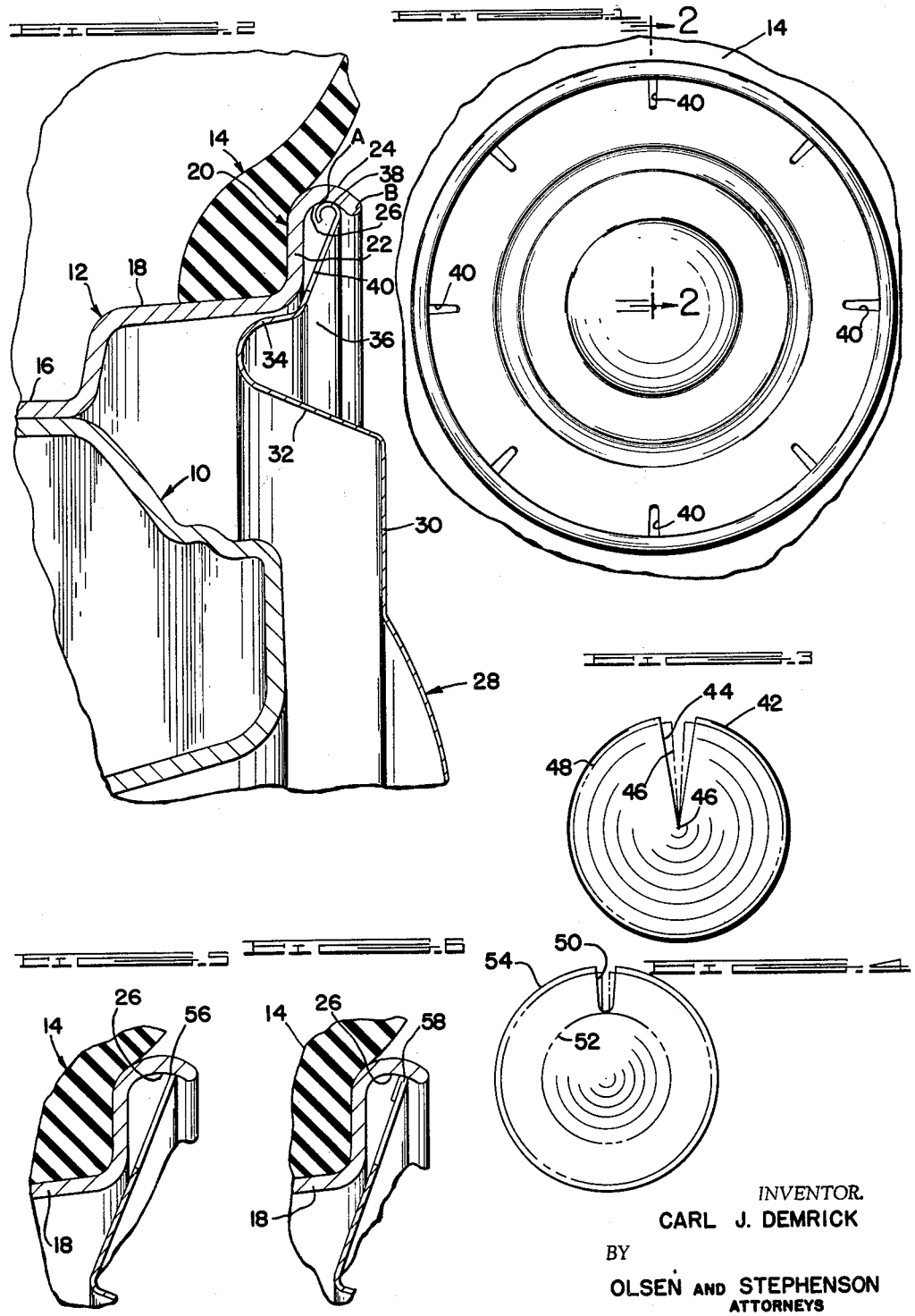
INVENTOR.
CARL J. DEMRICK
BY
OLSEN AND STEPHENSON
ATTORNEYS Jan. 26, 1965     C. J. DEMRICK     3,167,358
WHEEL COVER
Filed April 13, 1964     6 Sheets-Sheet 2
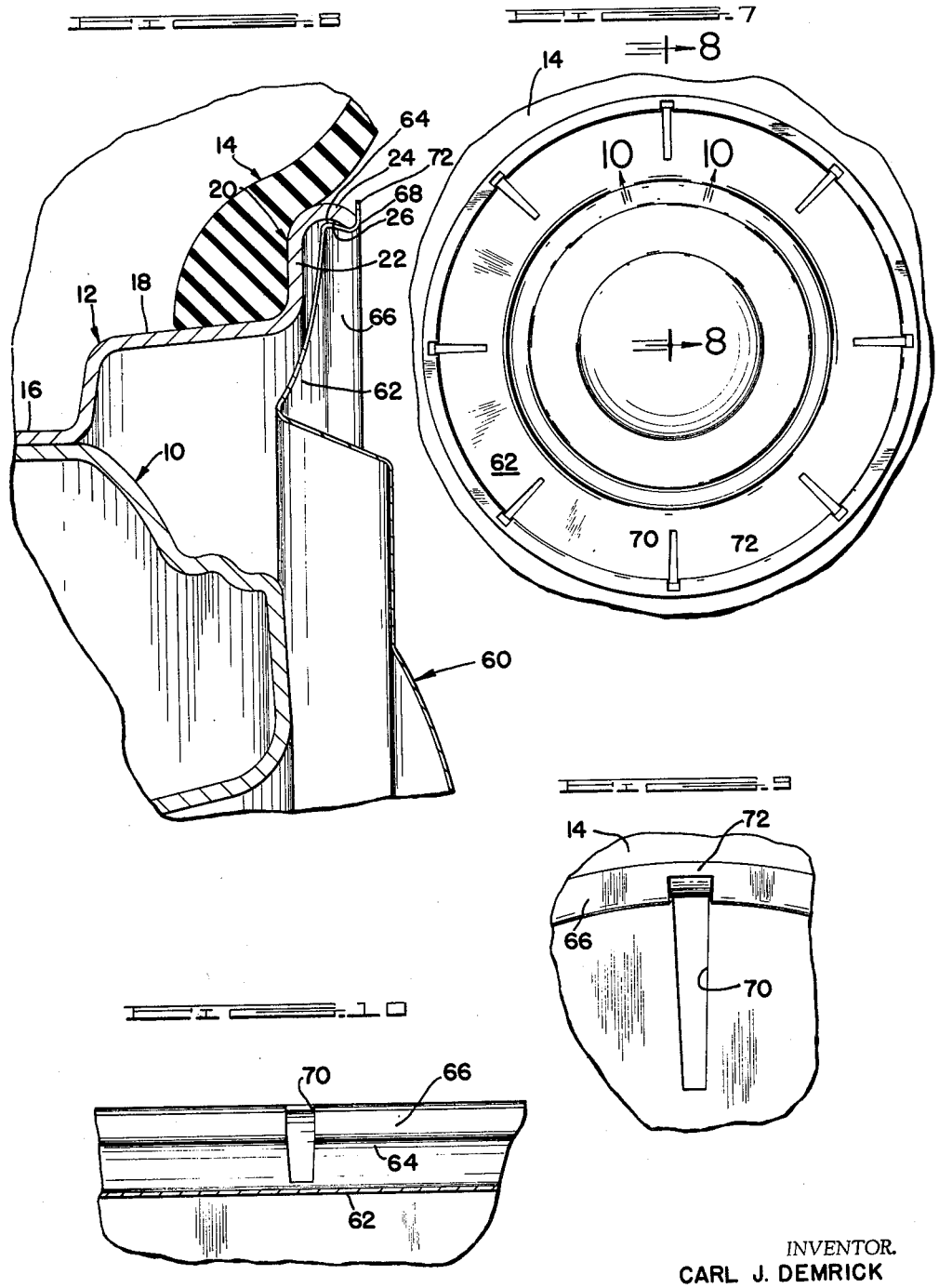
INVENTOR.
CARL J. DEMRICK
BY
OLSEN AND STEPHENSON
ATTORNEYS Jan. 26, 1965   C. J. DEMRICK   3,167,358
WHEEL COVER
Filed April 13, 1964   6 Sheets-Sheet 4

INVENTOR.
CARL J. DEMRICK
BY OLSEN AND
    STEPHENSON

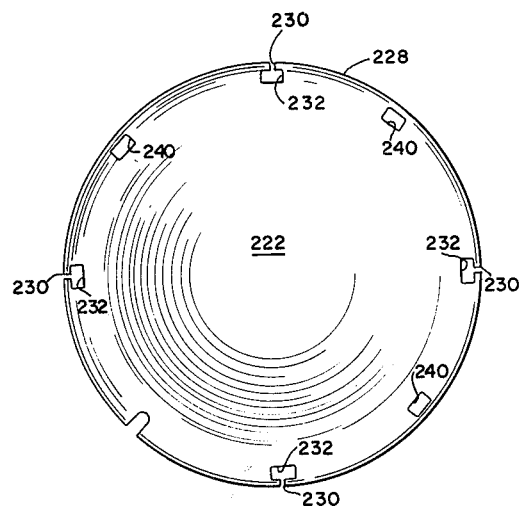
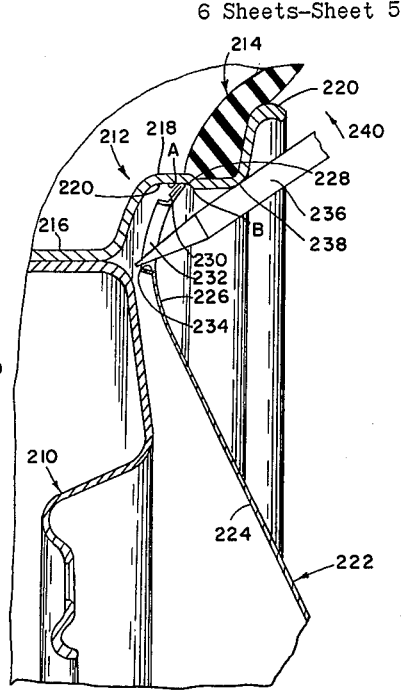
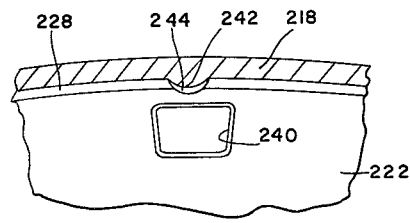
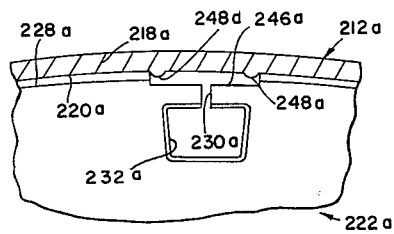
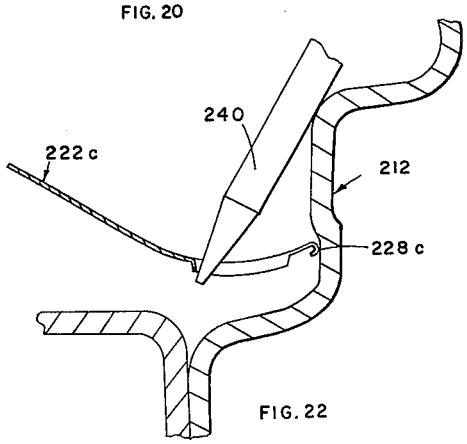
INVENTOR.
CARL J. DEMRICK
BY OLSEN & STEPHENSON Jan. 26, 1965   C. J. DEMRICK   3,167,358
WHEEL COVER
Filed April 13, 1964   6 Sheets-Sheet 6
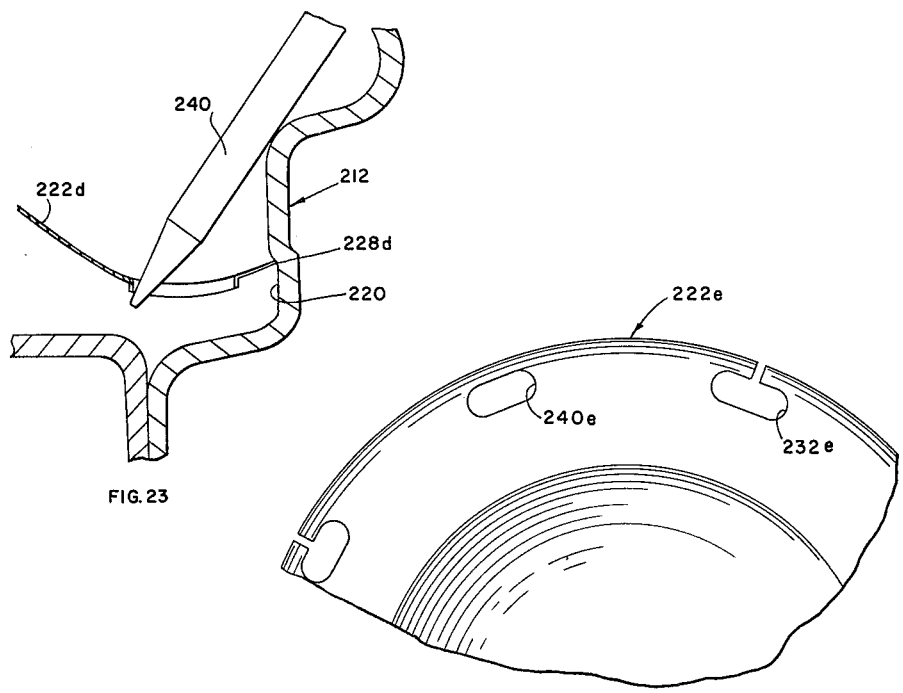
FIG. 23
FIG. 24
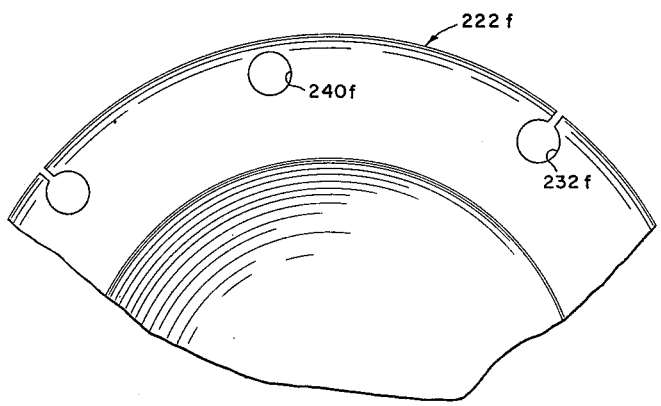
FIG. 25
INVENTOR.
CARL J. DEMRICK
BY OLSEN & STEPHENSON

United States Patent Office 3,167,358
Patented Jan. 26, 1965

3,167,358
WHEEL COVER
Carl J. Demrick, Birmingham, Mich., assignor to Avis Industrial Corporation, Adrian, Mich., a corporation of Delaware
Filed Apr. 13, 1964, Ser. No. 359,386
25 Claims. (Cl. 301—37)

The present invention relates to improvements in wheel structures and more particularly relates to wheel covers and their means for attachment to and removal from the rims or body portions of wheels. The present application is a consolidation of pending applications Serial No. 219,479, filed August 27, 1962, Serial No. 236,843, filed November 13, 1962, and Serial No. 256,958, filed February 7, 1963, each of which is now abandoned, and each of which the present application is a continuation-in-part.

It is an object of the present invention to provide a wheel structure having an improved cover for press-on and pry-off disposition over the outer side of the wheel.

It is another object of the present invention to provide a wheel cover requiring a minimum of material and tooling for its manufacture, enabling relatively low cost covers to be produced.

It is another object of the present invention to provide a wheel cover of the foregoing character having improved retaining means for maintaining the cover on the terminal flange of the tire rim of the wheel.

It is another object of the present invention to provide a wheel cover of the foregoing character which is characterized by its rigid hold-on means and which cover can readily be removed by a pry-off tool.

It is still another object of the present invention to provide a wheel cover adapted to be mounted on the terminal flange of a tire rim, said cover being characterized by its ability to accommodate a range of allowable tolerances in the dimensions of the terminal flange of the rim and which will retain its required retention characteristics when used with rims having such allowable tolerances.

It is still another object of the present invention to provide a wheel cover adapted to be mounted on the terminal flange of a tire rim, and which is constructed and arranged so that an intermediate annular portion of the cover is adapted to extend within an intermediate flange of the tire rim in close, spaced relationship thereto to absorb extreme vertical shocks applied to the wheel structure and thereby to the cover, and to relieve the cover retaining structure from performing this function.

It is still another object of the present invention to provide a wheel cover adapted to be retainingly mounted on the terminal flange of a tire rim and which will substantially conceal the outer side of the tire rim.

It is still another object of the present invention to provide an improved wheel cover which is constructed and arranged to have an outer peripheral edge adapted to be retainingly seated in a radially inwardly facing groove of a wheel, and which cover has improved means for receiving a pry-off tool and for effecting removal of the cover by such pry-off tool.

It is still another object of the present invention to provide an improved wheel cover of the foregoing character which is constructed and arranged so that it has optimum retention properties and which is characterized by the ease with which it can be removed.

It is still another object of the present invention to provide an improved wheel cover of the foregoing character which is constructed and arranged so that it can be mounted on the wheel and removed therefrom a substantial number of times without altering the construction or retention properties of the cover.

As suggested above, one of the problems that is inherent in the design of wheel covers or hub caps is that of providing a simple means for removal of the cover from the wheel, and there is also a need to construct the cover and the wheel so that there is assurance that there always will be corotation of the cover or hub cap relative to the wheel when the automobile is in motion.

A still greater and more pressing need in the automotive industry is that of manufacturing a wheel cover or hub cap of superior quality at a relatively low cost. Important factors in determining cost are the raw material costs, the tooling costs for manufacturing the covers or hub caps, labor costs, and the like. Bearing in mind that four hub caps or wheel covers are required for each automobile manufactured, and considering the large numbers of automobiles manufactured per year, it is believed quite clear that small savings in each of the cost factors enumerated above represent a very large savings per year to the automotive industry.

One of the important cost factors in making hub caps or wheel covers is that which arises when deep draw operations occur in making these items. In order to avoid rupture of the sheet metal when making such draws, a relatively heavy gauge and high grade of metal is required. Thus, a design of cover or hub cap which will allow a lighter gauge metal will reduce both raw material costs as well as tooling costs.

Therefore, it is one of the important objects of the present invention to provide an improved hub cap which will have a larger wheel concealing capacity while using relatively less material than would be required for a smaller conventional hub cap.

It is another object of the present invention to provide a hub cap of the foregoing character which is constructed and arranged so that it can be made from suitable plastic materials or non-ferrous metals.

It is still another object of the present invention to provide an improved wheel cover of the foregoing character which is constructed and arranged and which has features which cooperate with the body of the wheel to assure corotation of the cover and the wheel at all times when the vehicle is in motion.

Other objects of this invention will appear in the following description and appended claims, reference being had to the accompanying drawings forming a part of this specification wherein like reference characters designate corresponding parts in the several views.

In the drawings:

FIGURE 1 is an outer side elevational view of a vehicle wheel structure embodying features of the present invention;

FIGURE 2 is an enlarged fragmentary radial sectional view taken substantially on the line 2—2 of FIGURE 1;

FIGURE 3 is a schematic top plan view of a conical member used in describing the operation of the present invention;

FIGURE 4 is a similar schematic top plan view of another conical member used in describing the present invention;

FIGURE 5 is a fragmentary radial section illustrating a modified form of the present invention;

FIGURE 6 is another fragmentary radial section showing still another modification of the present invention;

FIGURE 7 is an outer side elevational view of a modified wheel structure embodying the present invention;

FIGURE 8 is an enlarged fragmentary radial sectional view taken substantially on the line 8—8 of FIGURE 7;

FIGURE 9 is an enlarged fragmentary outer side elevational view at one of the radial slots in the modification shown in FIGURE 7;

FIGURE 10 is an enlarged fragmentary sectional view taken on the lines 10—10 of FIGURE 7;

FIGURE 18 is a side elevational view of still another modification of a wheel cover or hub cap embodying features of the present invention;

FIGURE 19 is an enlarged fragmentary radial sectional view showing the wheel cover or hub cap of FIGURE 18 mounted on a conventional wheel and showing a cover removal tool in place for removing the cover from the wheel;

FIGURE 20 is an enlarged fragmentary view showing a terminal portion of the inner side of the cover of FIGURE 18 and an adjacent sectioned portion of the rim as well as the cooperating anti-turn elements of the two parts;

FIGURE 21 is an enlarged fragmentary section of a modified form of the anti-turn means illustrated in FIGURE 20;

FIGURE 22 is an enlarged fragmentary radial sectional view of a wheel in a horizontal position, showing a modified form of the wheel cover of FIGURE 18;

FIGURE 23 is an enlarged fragmentary radial sectional view similar to that of FIGURE 22, but showing still another modification of the wheel cover;

FIGURE 24 is an enlarged fragmentary side elevational view similar to that of FIGURE 18, but showing another modification of this cover; and FIGURE 25 is another enlarged side elevational view of still another modification of the wheel cover shown in FIGURE 18.

Figure 11:
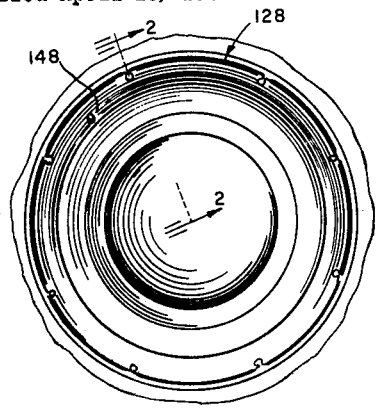
FIGURE 11 is an outer side elevational view of a modified vehicle wheel structure embodying features of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The present invention is adapted for use in one of its forms in a wheel structure having a conventional wheel body 10 and drop center, multi-flange tire rim 12 on which is carried a pneumatic tire 14. The tire rim 12 has a base flange 16, an axially outwardly extending intermediate flange 18 from which extends a terminal flange 20 including a radially outwardly extending portion 22 and a terminus or terminal lip portion 24 which defines a radially inwardly facing annular groove 26.

Mounted on and covering the outer side of the wheel is a cover member 28 which is retainingly held in the annular groove portion 26 of the tire rim 12. The cover member 28 has a central crown portion 30 which converges axially inwardly and radially outwardly at 32, after which the cover member 28 has a generally reverse bend so that it is turned axially and radially outwardly as at 34 to be in close proximity to but spaced from the intermediate flange 18 of the tire rim 12. The radially outer annular portion of the cover member 28 then defines a generally frusto-conical portion 36 which terminates at its base in a beaded or rolled over edge 38. The frusto-conical portion 36 has a limited number of radially inwardly extending slots 40 which are relatively narrow in circumferential direction and which are relatively short in a radial direction. The numbers of the slots 40 as well as their dimensions are significant features of the present invention as will be described hereinafter.

It can be seen in FIGURES 1 and 2 of the drawings that the frusto-conical portion 36 is continuous in a circumferential direction except for the radial slots 40 that are cut therein. In the illustrated embodiment, eight such slots are shown. When the cover member 28 is in its free and unsprung condition prior to being mounted on the tire rim 12, the outer diameter of the beaded circumferential edge 38 will be slightly larger than the largest diameter of the groove 26, as measured at the location A, FIGURE 2. Therefore, when the cover member 28 is mounted on the tire rim 12, the slots 40 will be constricted by virtue of the frusto-conical portion 36 necessarily being constricted at its base to permit the base to fit into the annular groove 26.

In determining the number of slots 40 to be used and the cumulative circumferential extent of the width of the slots 40, it is desired that only a sufficient number be used and the spacing be such that the cumulative circumferential extent of the slots 40 at the base 38 will approach zero when the base is passed over the radially smallest portion of the annular groove 26, as measured at the location B, FIGURE 2. Thus, under ideal conditions, only one radial slot 40 would be necessary and its dimension in a circumferential direction would only have to be sufficiently large so that when the frusto-conical portion 36 was pressed against the tire rim 12, the maximum constriction of the base 38 that could occur would be enough only to allow the base to be cammingly pressed over the smallest diameter, at location B, of the rim terminus, after which the spring properties of the material forming the cover 28 would restore the frusto-conical portion 36 as far as possible toward its original dimensions. Since the annular groove 26 has a smaller diameter at its largest portion than the normal diameter of the unrestricted base 38, the radial slot will remain partially constricted toward its closed portion. Under these circumstances, the frusto-conical portion 36 will be a substantially continuous annular section which will rigidly oppose any outward thrust tending to move the cover member 28 axially away from the tire rim 12. Only by permanently deforming the frusto-conical portion 36 can the cover member 28 be removed when subjected to forces of this nature.

Referring to FIGURES 3 and 4, a further brief explanation will be made of the features of the invention described above to assure a clear understanding of the same. FIGURE 3 illustrates a conical member 42 having a radial slot 44 extending to its axis 46. When the slot 44 is constricted to a position such as is shown by the broken line at 46, the circumference and thereby the diameter of the base of the conical member will be constricted to the dimension shown at the broken line 48. If the radial slot 44 were completely closed, the base portion of the conical member would have its smallest diameter, and a force acting downwardly on the axis 46 would place the entire conical member in compression for supporting such load. Also, such a force would tend to spread the base radially outwardly. If at the time the force were applied the base of the conical member was confined in an annular groove such as is defined by the groove 26 of the tire rim 12, the load acting along the axis 46 would necessarily have to deform and collapse the conical member to press the conical member completely through the grooved structure 26. It will be readily understood that a conical member confined in the described manner would strongly resist any force tending to push it through the grooved structure.

The same principle would apply if only an annular segment of the conical member included a radial slot such as is shown by the slot 50 in FIGURE 4. As shown by the broken line 52, the radial slot 50 extends through a major portion of the frusto-conical portion defined between the base 54 and the broken line 52, and again, it will be readily understood that if the base 54 is confined by an annular structure such as the groove 26, a force applied downwardly along the axis of the conical member will place the frusto-conical segment in a state of compression, and it will require a very substantial load to press the annular segment axially through the groove structure 26, and this could be accomplished only by completely collapsing the material defining the conical member.

From the foregoing explanations, it is believed clear that the cover member 28 can withstand very large forces tending to move the cover member 28 axially away from the rim 12. It can be understood that it will be necessary to collapse the cover member 28 in order to remove it from the rim merely by a straight axial force. In view of the fact that it is essential that the cover member 28 be removable to provide access to the wheel bolts, and the like, a means must be provided for removing the cover member 28 from the rim 12. This can be readily accomplished by inserting a pry-off tool such as a screwdriver or the like into one of the slots 48 generally tangentially of the outer periphery of the cover and then by pressing the outer end of the tool with respect to the cover member 28 so as to pry one edge of the slot 40 axially outwardly with respect to the other edge of the slot 40. It is found that the cover member 28 can be sprung from the groove 26 in this manner. However, since forces of this nature are not applied to the cover member when it is in its normal position on the wheel and under normal operating conditions of the vehicle, there is no danger that the cover member 28 will be inadvertently thrown from the tire rim 12 while the vehicle is in motion.

The number of slots 40 can be as low as one in number and a larger number equally spaced in symmetrical arrangement having approximately the same circumferential extent as would be necessary to allow the limited circumferential constriction described above may be used. The radial depth of the one or more slots 40 must also be sufficient to allow the necessary circumferential constriction for camming the cover member 28 onto the rim 12 and for allowing the cover member 28 to be pried therefrom in the manner explained above.

The frusto-conical portion 36 necessarily must converge axially inwardly so that it will always be placed under compression to oppose any thrusts tending to urge the cover member 28 axially away from the rim 12. If desired, the cover member 28 may also have the annular portion 38 located in close proximity to the intermediate flange 18, so that when the wheel structure is subjected to several vertical shocks, the annular portion 34 will engage the intermediate flange 18 to absorb at least a portion of such vertical shocks and thereby relieve the terminal retention portion 38 from performing this entire function.

It is not essential that the cover member 28 have a beaded or turned outer periphery 38 as is shown in FIGURE 2. If desired, the cover member 28 may be modified to have an edge 56 which may thrustingly engage against the inner side of the annular groove 26, and such an arrangement can be seen in FIGURE 5. In FIGURE 6, still another modification is shown wherein the outer edge of the cover member is folded over as at 58 to provide a relatively stiffer outer edge for thrustingly engaging the annular groove 26.

Attention is now directed to FIGURES 7–10, inclusive, wherein still another modification of the present invention is shown. As shown, the cover member 60 has an annular frusto-conical portion 62 which has its base portion 64 seated in the annular groove 26 of the rim 12 in the same manner as is shown with respect to the embodiment of the invention shown in FIGURES 2, 5 and 6. However, the embodiment of FIGURES 7–10 has an outer annular peripherial portion 66 which forms a continuation of the frusto-conical portion 62 and which has a reverse bent portion 68 enabling the annular peripheral portion 66 to overlie and conceal the terminal end of the tire rim 12. The radial slots 70 extend through the base of the frusto-conical portion 62 and extend out to, but terminate short of the peripheral edge 72 of the cover member 60. As can be seen, the peripheral edge 72 is continuous, and therefore it can not be constricted so that it is necessary that the slot 70 be of sufficient length on each side of the base 64 to allow the necessary constriction at the base of the frusto-conical portion 62 when pressing the cover member 60 onto the rim. The embodiment of the invention can be removed from the rim 12 by a pry-off tool in the same manner as was described previously with respect to the embodiment of FIGURE 2.

As explained above, the present invention is adapted for use with a wheel structure having an annular flange portion with a radially inwardly facing groove in which a wheel cover or hub cap can be retained. In another embodiment, the invention is adapted for use, for example, in a wheel structure having a conventional wheel body 110 and drop center, multi-flange tire rim 112 on which is carried a pneumatic tire 114. The tire rim 112 has a base flange 116, an axially outwardly extending intermediate flange 118 from which extends a terminal flange 120 including a radially outwardly extending portion 122 and a terminus or terminal lip portion 124 which defines a radially inwardly facing annular groove 126.

Mounted on and covering the outer side of the wheel is a cover member 128 which is retainingly held in the annular groove 126 of the tire rim 112. The cover member 128 has a central crown portion 130 which converges axially inwardly and radially outwardly at 132, after which the cover member 128 has a generally reverse bend so that it is turned axially and radially outwardly, as at 134, to be in close proximity to but spaced from the intermediate flange 118 of the tire rim 112. The radially outer annular portion of the cover member 128 then defines a generally frusto-conical portion 136 which terminates at its base in a folded over edge 138. The frusto-conical portion 136 has a limited number of radially inwardly extending slots 140 which are relatively narrow in circumferential direction and which are relatively short in a radial direction and terminate in relatively larger openings 142. At each of the slots 140, the edge 138 has a notch or recess 144 of limited radial dimension and of sufficient circumferential extent to receive a pry-off tool 146, such as is shown by way of example in FIGURES 13, 14 and 15.

The frusto-conical portion 136 is continuous in a circumferential direction except for the radial slots 140 and their associated openings 142 and notches 144. In the illustrated embodiment, eight such slots are shown. When the cover member 128 is in its free and unsprung condition prior to being mounted on the tire rim 112, the outer diameter of the folded circumferential edge 138 will be slightly larger than the cover member 128 axially away from the rim 112. It can be understood that it will be necessary to collapse completely the cover member 128 in order to remove it from the rim merely by a straight axial force. In view of the fact that it is essential that the cover member 128 be removable to provide access to the wheel bolts, and the like, a means must be provided for removing the cover member 128 from the rim 112.

Figure 13:
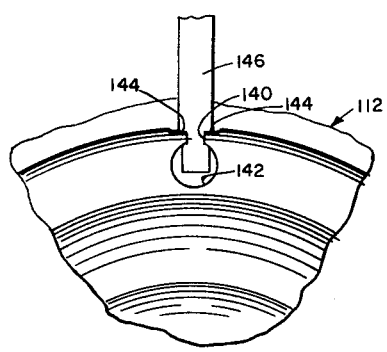
FIGURE 13 is an enlarged fragmentary side elevational view showing a peripheral portion of the wheel cover of FIGURE 11 with a pry-off tool in position for use in removal of the cover.
Figure 12:
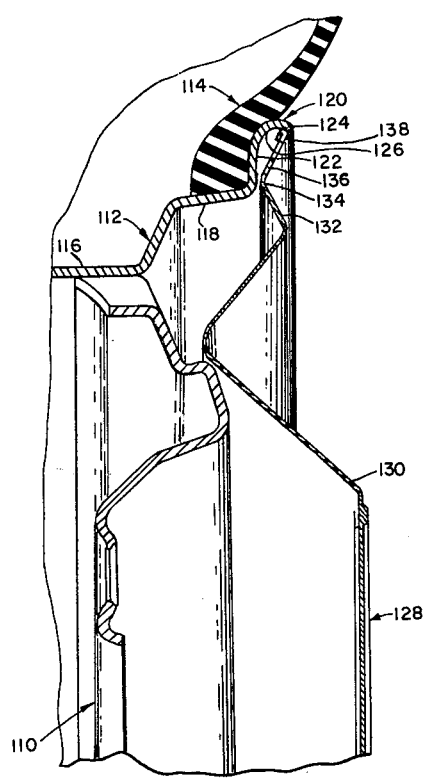
FIGURE 12 is an enlarged fragmentary radial sectional view taken substantially on the line 12—12 of FIGURE 11.
Figure 14:
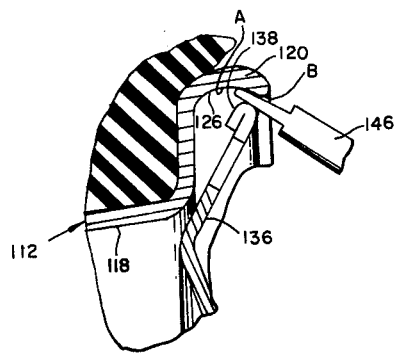
FIGURE 14 is a radial sectional view of the cover of FIGURE 11 showing a pry-off tool being inserted into cover-removal position.
Figure 15:
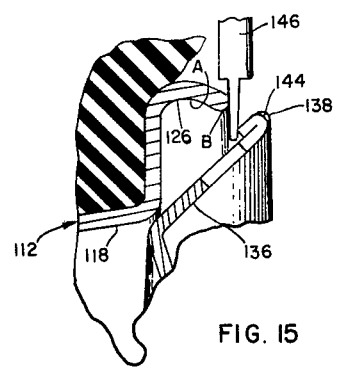
FIGURE 15 is a radial sectional view similar to that of FIGURE 14, but after the pry-off tool has been used to pry a portion of the cover away from the rim.

In the described embodiment in FIGURES 11 to 15, a pry-off arrangement has been provided which is characterized by the effortless manner that an individual can remove the cover without damage to either the cover or the wheel. Referring particularly to FIGURES 13, 14 and 15, the procedure for removal of the cover member 128 from the rim 112 will be described. A pry-off tool 146 is initially inserted between the terminal flange 120 and the edge 138, at a notch or recess 144, as shown in FIGURE 14, and by use of the terminal flange 120 as a fulcrum, the frusto-conical portion 136 can be deflected radially inwardly and then axially outwardly, as shown in FIGURE 15. Removal of the pry-off tool 146 will then result in the frusto-conical portion 136 springing radially outwardly against the axially outer side of the terminal flange 120. This will be true for a limited portion of the edge 138 on each side of the slot 140. By repeating the same pry-off action at one or more of the adjacent slots 140, the cover member 128 will spring out of the retaining annular groove 126. As indicated above, very little effort is required to perform these series of pry-off operations, and no scratching or other marking of the cover member 128 or rim 112 will occur. To return the cover member 128 to its retain position on the rim 112, the valve stem hole 148 of the cover member 128 is initially fitted over the valve stem with the adjacent edge 138 seated in the annular groove 126, and the diametrically opposite portion of the cover member 128 is then given a single, sharp blow which will result in cammingly driving the remainder of the edge 138 into the annular groove 126 to a retained position such as is shown in FIGURE 2.

Another feature of the described embodiment of FIGURES 11 to 15 is the enlarged openings 142 at the radially inner ends of the slots 140. In the illustrated embodiment, the openings are circular, but any configuration may be used which satisfactorily prevents excessive local concentrations of stresses at locations at the radically inner ends of the slots 140 resulting from constriction of the edge 138 when applying and removing the cover 128. The openings 142 also function to permit removal of the cover 128 by the pry-off tool 146, in the manner explained above, because they more readily permit local deflection of edge 138 to the position shown in FIGURE 15.

Figure 16:
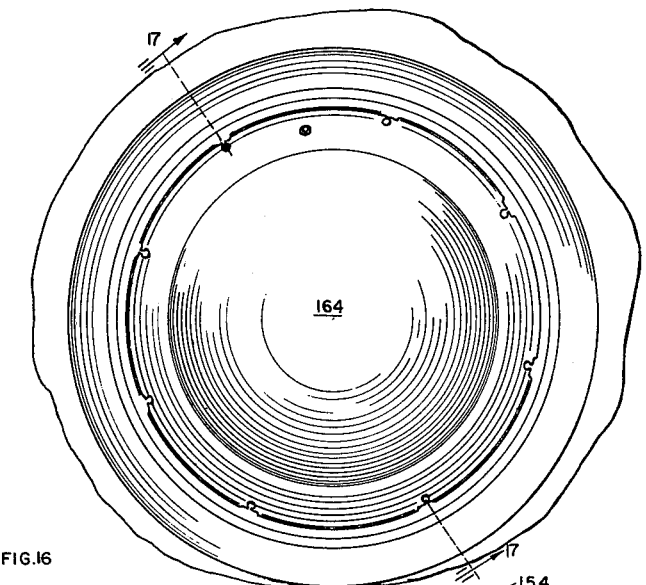
FIGURE 16 is an outer side elevational view of a vehicle wheel structure embodying features of another modified form of the invention.
Figure 17:
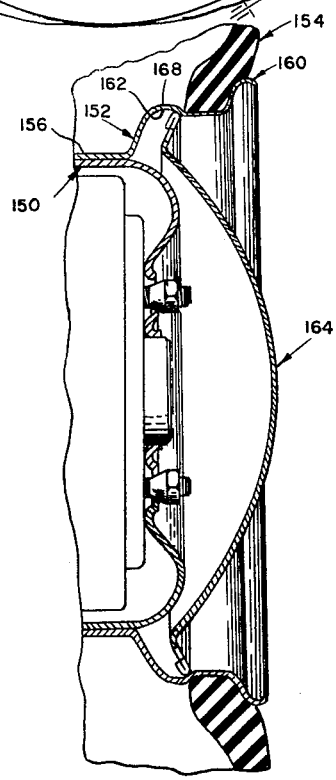
FIGURE 17 is a radial sectional view taken on the line 17—17 of FIGURE 16.

The wheel cover 126 has been described as mounted on the terminal flange 120, but it is to be understood that the present invention is not limited to a cover mounted at this exact location of the rim or wheel. Referring to FIGURES 15 and 16, a modified arrangement is shown wherein the cover member is mounted in a different location. In this embodiment, a wheel structure is provided having a conventional wheel body 150 and drop center, multi-flange tire rim 152 on which is carried a pneumatic tire 154. The tire rim 152 has a base flange 156, an axially outwardly extending intermediate axial flange 158 from which extends a terminal flange 160. The intermediate axial flange 158 has an annular, radially inwardly facing groove 162 which is adapted to receive and cooperate in retaining the cover member 164 in the same manner as the annular groove 126 of the embodiment of FIGURES 11 to 15.

The cover member 164 has the same construction for retention and for pry-off purposes as shown and described in the embodiment of FIGURES 11 to 15, and therefore, a detailed description of these structural details will not be given, reference being made to the description of FIGURES 11 to 15 for these purposes.

Attention is now directed to FIGURES 18 to 25 for an explanation of still other embodiments of the present invention. In one of these embodiments, the invention is adapted for use, for example, in a wheel structure having a conventional wheel body 210 and drop-center, multi-flange tire rim 212 on which is carried a pneumatic tire 214. The tire rim 212 has a base flange 216, an axially outwardly extending intermediate flange 218 from which extends a terminal flange 220. The intermediate flange 218 has formed therein a radially inwardly facing annular groove 220.

Mounted on and covering the outer side of the wheel is a hub cap or cover member 222 which is retainingly held in the annular groove 220 of the tire rim 212. The cover member 222 has a central crown portion 224 which converges axially inwardly and radially outwardly until it reaches the generally reverse bend at 226 after which it is turned axially and radially outwardly until it terminates in the folded over terminal edge 228. The radially outer portion of the cover 222 has a limited number of radially inwardly extending slots 230 which are relatively narrow in a circumferential direction and which are relatively short in a radial direction and terminate in relatively large opening 232. The edges of the opening 232 are reinforced by an inwardly directed flange 234 which is formed from a portion of the material that was struckout of the cover 222 when forming the openings 232.

The terminal edge 228 is continuous in a circumferential direction except for the radial slots 230. In the illustrated embodiment of FIGURES 18 to 20, four such slots are shown. When the cover member 222 is in its free and unsprung condition prior to being mounted on the tire rim 212, the outer diameter of the folded terminal edge 228 will be slightly larger than the largest diameter of the groove 220, as measured at the location A of FIGURE 19. Therefore, when the cover member 222 is mounted on the tire rim 212, the slots 230 will be constricted in order to permit the edge 228 to fit into the annular groove 220.

In determining the number of slots 230 to be used and the cumulative circumferential extent of the width of the slots 230, it is normally necessary that only a sufficient number of such slots be used and the spacing be such that the cumulative circumferential extent of the slots 230 will approach zero when the base or edge 228 is pressed over the radially smallest portion of the annular groove 220, as measured at the location B of FIGURE 19. Thus, under ideal conditions, only one radial slot 230 would be necessary, and its dimension in a circumferential direction would have to be only sufficiently large so that when the edge 228 was being constricted while being pressed over the axial flange portion at B, the maximum constriction of edge 228 that could occur would be enough only to allow the edge to be cammingly pressed over the smallest diameter, at location B, after which the spring properties of the material forming the cover member 222 would restore the edge 228, as far as possible, toward its original dimensions. Since the annular groove 220 has a smaller diameter at its largest radius than the normal diameter of the unrestricted edge 228, the radial slot will remain partially constricted toward its closed position. Under these circumstances, the edge 228 will be a substantially continuous edge which will rigidly oppose any outward thrust tending to move the cover member 222 axially away from the tire rim 212. Only by permanently deforming the outer peripheral portion of the cover member 222 can the latter be removed when subjected to forces of this nature.

From the foregoing explanation, it is believed clear that the cover member 222 can withstand a very large force tending to force the cover member 222 axially away from the rim 212. Because of the angle of inclination of the edge portion 228 relative to the groove 220, it can be understood that it will be necessary to collapse completely the cover member 222 in order to remove it from the rim merely by a straight axial thrust. In view of the fact that it is essential that the cover member 222 be removable to provide access to the wheel bolts, and the like, a means must be provided for removing the cover member 222 from the rim 212.

In the described embodiment, a pry-off arrangement has been provided which is characterized by the effortless manner in which an individual can remove the cover without damage to either the cover or the wheel. Referring to FIGURE 19, the procedure for the removal of the cover member 222 from the rim 212 will be described. A pry-off tool 236 is initially inserted into one of the openings 232 and against the radially innermost portion of the flange 234, and the shank of the pry-off tool 236 is then placed against the radially outwardly turned shoulder 238 of the rim 212 so that such shoulder 238 can serve as a fulcrum. The free end of the pry-off tool 236 is then given a single sharp blow in the direction of the arrow 240. This will have the effect of urging the flanged edge 234 radially inwardly to cause a limited transverse bowing of the crown portion 224, thereby allowing the edge 228 to move radially inwardly out of the annular groove 220. Because of the position of the pry-off tool 236, an axially outwardly directed component of force will also be exerted against the flanged edge 234, thereby causing the cover 222, in effect, to snap out of the retaining or annular groove 220. It is found that this removal operation can be carried out by a single firm blow on the free end of the pry-off tool 236, and when the cover 222 is so removed, there will be no resulting damage either to the rim or to the cover.

As indicated above, the embodiment of the invention illustrated in FIGURES 18 to 20 utilizes only four radial slots 230 which terminate in the enlarged opening 232. It may be desired to provide additional openings such as are shown at 240 which may also be used in a similar manner for removal of the cover from the rim 212. The openings 240 are identically the same as the openings 232 except that the openings 240 do not have a radial slot 230 extending outwardly to the terminal edge 228 of the cover. In the described embodiment, the openings 232 and 240 are generally rectangular in shape, which shape is found to be very satisfactory for the purposes of receiving the end of a pry-off tool 236.

In order to assure co-rotation of the cover member 222 with the rim 212, it may be desired to provide anti-turn means, and for this purpose, a projection 242 may be formed in the rim 212, and a corresponding indentation may be provided in the edge 228 which can straddle the radially inwardly projecting element 242. In this arrangement, the radially inward projection 242 will have circumferentially oppositely disposed shoulders which are straddled by the indentation 244, thereby preventing relative rotation in either direction.

From the foregoing description of the embodiment of FIGURES 18 to 20 it can be understood that a relatively flat hub cap or cover 222 is provided which does not require an underturned flange of the type conventionally used in hub caps for holding the hub cap on wheel body bumps or similar retention elements on the wheel body. Thus, a lighter gauge metal may be employed, or if desired, a suitable plastic material or non-ferrous material may be used. Furthermore, the cover embodying the present invention will conceal a larger portion of the wheel body and will have a more decorative appearance than the conventional hub cap.

The present invention is not limited to the specific anti-turn means that are illustrated in FIGURE 20, and it is contemplated that other anti-turn means may also be used. A modified form of an anti-turn means is shown in FIGURE 21 to which attention is now directed. As here shown, the cover member 222a has a circumferentially extending notch 246a which is located at the radially outer end of the radial slot 230a, which slot opens at its other end at the opening 232a. The rim 218a has a pair of spaced radially inwardly extending projections 248a formed in the annular groove 220a, and the notch 246a is adapted to straddle the oppositely facing shoulders defined by the projections 248a, thereby assuring corotation of the cover member 222a with the rim 212a. It is to be recognized that the notch formation 246a is the same as that disclosed in the embodiments illustrated in FIGURES 11 to 17, and this notch may be used for cover removal purposes under circumstances such as are described in connection with the aforesaid embodiments of FIGURES 12 to 17.

In the embodiment described in FIGURES 17 to 20, the peripheral edge 228 is shown to be a tightly folded over edge. Under certain circumstances it may be desired to modify this edge construction, and attention is directed to the embodiments shown in FIGURES 22 and 23 for illustrations of alternate edge constructions. As shown in FIGURE 22, the edge 228c is a rolled or beaded construction. In other respects the cover 222c, the pry-off tool 240 and the rim 212 will be the same as that described with respect to the embodiment of FIGURES 18, 19 and 20, and the procedure for removal of the cover 222c from the rim 212 will be the same. As shown in FIGURE 23, the edge 228d can be a rather sharp edge which bitingly engages the base of the annular groove 220, and in other respects the cover 222d is the same as cover 222.

It is also contemplated that the openings 232 and 240 shown in the embodiment of FIGURES 18, 19 and 20 may have different configurations than the rectangular configuration shown in that embodiment. Thus, if desired, the cover 222e, shown in FIGURE 24 may have oval openings 232e and 240e. Similarly, the cover 222f shown in FIGURE 25, may have circular openings 232f and 240f. It will be understood by those skilled in the art that other openings may be utilized which are adapted to receive the end of a pry-off tool 240, and in all such instances, the cover can be removed in the same manner as was previously described in connection with the embodiment illustrated in FIGURES 18, 19 and 20.

Having thus described my invention, I claim:

1. In a wheel structure including a wheel body and a tire rim having a flange provided with a radially inwardly facing circumferential groove, a cover member for disposition over the outer side of the wheel body and at least a portion of the rim, said cover member having an annular outer portion inclined axially and radially inwardly, the radially outer periphery of said annular outer portion being seated in said circumferential groove for retaining the cover member on the rim, said annular outer portion having at least one radially inwardly extending slot adapted to be substantially closed when pressing the cover member onto said rim and wherein the circumferential extent of the slotted area is such that when closed the outer diameter of the annular outer portion will be approximately equal to but slightly less than the inner edge of said circumferential groove.

2. In a wheel structure including a tire rim having a terminal flange defining at its terminus a radially inwardly opening circumferential groove, a cover member for disposition over the outer side of said wheel structure having a generally frusto-conical annular portion inclined radially and axially inwardly with the base of said portion seated in said groove, at least one slot in said frusto-conical annular portion extending from the base thereof toward the apex thereof and with the circumferential extent of the slotted area such that when closed the diameter of said base is approximately equal to the inner diameter of the terminus of said flange.

3. In a wheel structure including a tire rim having a terminal flange defining at its terminus a radially inwardly opening circumferential groove, a cover member for disposition over the outer side of said wheel structure having an annular segment defining a frustum, the base of said frustum being heated in said groove and being located so that the apex of the frustum is on the axis of the wheel structure axially inwardly of said circumferential groove, and said annular segment having at least one relatively narrow slot extending in a radial direction through the base and terminating in said frustum so that the diameter of said base can be varied a limited amount by circumferentially varying the opening of said slot, the effective circumferential width of said slot being such that when the slot is closed the diameter of said base will be substantially equal to the inner diameter of said groove.

4. In a wheel structure including an axially extending flange defining a radially inwardly opening circumferential groove, a cover member for disposition over the outer side of the wheel structure having its outer peripheral edge seated in said groove, the radially outermost portion of the cover member converging axially inwardly and having a plurality of thin radial slots circumferentially spaced and extending through the seated edge radially inwardly substantially to the axially inner limit of the axially inwardly converging portion of the cover member to allow constricting of said edge, the cumulative circumferential extent of said slots at said edge being such that when the slots are closed by constricting said edge, said edge will have a diameter approximately equal to the smallest diameter of said groove to allow said cover member to be pressed onto said rim in seating relation thereto, said cover member having in its free state a diameter at said edge slightly larger than the largest internal diameter of said groove.

5. A wheel structure as claimed in claim 4 wherein said edge of the cover member is an axially inwardly directed beaded edge.

6. A wheel structure as claimed in claim 4 wherein said edge of the cover member is a tightly folded-over edge.

7. A wheel structure as claimed in claim 4 wherein said edge of the cover member is the terminal edge of the material forming said cover member.

8. In a wheel structure including a tire rim having a a terminal flange defining at its terminus a radially inwardly opening circumferential groove, a cover member for disposition over the outer side of the wheel structure, said member having an intermediate annular portion inclined radially and axially inwardly with the outer end of said intermediate annular portion being seated in said groove and being integrally connected to an outer annular portion formed with a reverse bend to enclose the axially outer side of the terminus of said terminal flange, said cover member having a plurality of thin radial slots extending from adjacent the axially inner end of said intermediate annular portion to adjacent the outer periphery of said outer annular portion, the circumferential extent of said slots at the seated outer end of said intermediate annular portion being such that when said slots are closed by constriction of said seated outer end, the diameter of said seated outer end will be approximately equal to the smallest diameter of said groove to allow said outer end to be pressed over the smallest diameter of said groove for seating said outer end in said groove.

9. In a wheel structure including a tire rim having a terminal flange defining at its terminus a radially inwardly opening circumferential groove, a cover member for disposition over the outer side of said wheel structure having a generally frusto-conical annular portion inclined axially and radially inwardly with the base of said portion seated in said groove, said frusto-conical annular portion being continuous except for at least one slot extending from said base radially inwardly therein for a distance sufficient to allow constriction of said base to a diameter substantially equal to the innermost diameter of said groove, the circumferential extent of the slotted area being such that when said at least one slot is constricted closed at said base, the diameter of said base is substantially equal to the innermost diameter of said groove.

10. In a wheel structure as defined in claim 9, wherein said generally frusto-conical annular portion is the radially outermost annular portion of the cover member and said at least one slot extends inwardly through the peripheral edge of the cover member.

11. In a wheel structure as is defined in claim 9, wherein said generally frusto-conical annular portion is an annular intermediate portion of the cover member and a reverse-bent radially outermost portion extends from said base to enclose the terminus of said terminal flange, said at least one slot extending through the reverse bend of said outermost portion.

12. In a wheel structure having an annular flange provided with a radially inwardly facing groove into which a pair of shoulders project which face in opposite circumferential directions, a cover for disposition at the outer side of the wheel structure and having a resilient self-sustaining annular outer portion inclined axially and radially inwardly from the outer edge of said annular outer portion, said outer edge being seated in said groove for retaining the cover on said annular flange, said annular outer portion having a plurality of narrow slots extending radially inwardly through said edge, the resilient properties of said annular outer portion being such that said edge can be constricted so that the slots are substantially closed and on release of the constricting forces the edge will spring back to its original unstressed shape, the cumulative circumferential extent of said slots being such that when the slots are closed by constriction, the diameter of said edge will approximate the radially inner diameter of the inwardly facing groove, said edge having a circumferentially extending notch which straddles said shoulders to assure corotation of said cover relative to said flange.

13. In a wheel structure as claimed in claim 10, wherein said notch is located in said edge adjacent to one of said slots, said notch having a greater circumferential extent than its associated slot and extending circumferentially on opposite sides thereof.

14. In a wheel structure having an axially extending annular flange provided with radially outwardly turned shoulder and a radially inwardly facing groove located axially inwardly from said shoulder, a cover for disposition at the outer side of the wheel structure and having a resilient self-sustaining annular outer portion inclined axially and radially inwardly from the outer edge of said annular outer portion, said outer edge being seated in said groove for retaining the cover on said annular flange, said annular outer portion having a plurality of slots extending radially inwardly through said edge and terminating in openings, the circumferential extent of each opening being greater than the circumferential extent of its associated slot, the resilient properties of said annular outer portion being such that said edge can be constricted so that the slots are substantially closed and on release of the constricting forces the edge will spring back to its original unstressed shape, the cumulative circumferential extent of said slots being such that when the slots are closed by constriction, the diameter of said edge will approximate the radially inner diameter of the inwardly facing groove, said openings being located and of a shape to receive the end of a cover removing tool fulcrumed on said shoulder, said openings having material struck from the openings forming axially inwardly directed flanges serving to reinforce the edges of the openings adapted to receive the cover removing tool, the cover having sufficient resilient properties so that it can be transversely bowed by the tool to pry the cover from the wheel structure.

15. A cover in a wheel structure as defined in claim 1 wherein said openings have a generally rectangular shape.

16. A cover in a wheel structure as defined in claim 1 wherein said openings have a generally oval shape.

17. A cover in a wheel structure as defined in claim 1 wherein said openings have a generally circular shape.

18. In a wheel structure including a wheel body part and a tire rim part, one of said parts having a flange provided with a radially inwardly facing annular groove, a cover member for disposition at the outer side of the wheel structure, said cover member having an annular outer portion inclined axially and radially inwardly from its outer periphery, the radially outer periphery of said annular portion being seated in said circumfeerntial groove for retaining the cover member on said one part, said annular outer portion having a plurality of radially inwardly extending slots terminating in enlarged openings, the cumulative circumferential extent of the widths of said slots being such that when the slots are closed as an incident to constriction of the annular outer portion when pressing the cover into seated relation with said groove, the diameter of said periphery will correspond substantially to the smallest diameter of said annular groove.

19. In a wheel structure including a tire rim having a terminal flange defining at its terminus a radially inwardly opening circumferential groove, a cover member for disposition over the outer side of the wheel structure having its outer peripheral edge seated in said groove, the radially outermost portion of the cover member converging axially inwardly and having a plurality of thin radial slots circumferentially spaced and extending through the seated edge radially inwardly and terminating in enlarged openings to allow constriction of said edge, said openings providing configurations at the inner ends of said slots to prevent local concentrations of stresses in said cover from constriction of said edge, the cumulative circumferential extent of said slots at said edge being such that when the slots are closed by constricting said edge, said edge will have a diameter approximately equal to the smallest diameter of said groove to allow said cover member to be pressed onto said rim in seating relation thereto, said cover member having in its free state a diameter at said edge slightly larger than the largest diameter of said groove.

20. In a wheel structure having an annular flange provided with a radially inwardly facing groove, a cover for disposition at the outer side of the wheel structure and having a resilient self-sustaining annular outer portion inclined axially and radially inwardly from the outer edge of said annular outer portion, said outer edge being seated in said groove for retaining the cover on said annular flange, said annular outer portion having a plurality of slots extending radially inwardly through said edge and terminating in enlarged openings, the cumulative circumferential extent of said slots being such that when the slots are closed by constriction of the annular outer portion, the diameter of said edge will approximate the inner diameter of the inwardly facing groove, said edge being partially constricted when seated in said groove.

21. In a wheel structure having an annular flange provided with a radially inwardly facing groove, a cover for disposition at the outer side of the wheel structure and having a resilient self-sustaining annular outer portion inclined axially and radially inwardly from the outer edge of said annular outer portion, said outer edge being seated in said groove for retaining the cover on said annular flange, said annular outer portion having a plurality of slots extending radially inwardly through said edge and terminating in enlarged openings, the cumulative circumferential extent of said slots being such that when the slots are closed by constriction of the annular outer portion, the diameter of said edge will approximtae the inner diameter of the inwardly facing groove, said edge having a circumferentially extending notch at each of said slots for receiving a pry-off tool, said annular outer portion having physical properties enabling it to be deflected radially inwardly by fulcrum action of said pry-off tool about the portion of said flange defining said inwardly facing groove.

22. In a wheel structure having an annular flange provided with a radially inwardly facing groove, a cover for disposition at the outer side of the wheel structure and having a resilient self-sustaining annular outer portion inclined axially and radially inwardly from the outer edge of said annular outer portion, said outer edge being seated in said groove for retaining the cover on said annular flange, said annular outer portion having a plurality of slots extending radially inwardly through said edge, the cumulative circumferential extent of said slots being such that when the slots are closed by constriction of the annular outer portion, the diameter of said edge will approximate the radially inner diameter of the inwardly facing groove, said edge having a circumferentially extending notch at each of said slots for receiving a pry-off tool, each said notch having a greater circumferential dimension and a smaller radial dimension than its associated slot.

23. In a wheel structure having an annular flange provided with a radially inwardly facing groove, a cover for disposition at the outer side of the wheel structure and having a resilient self-sustaining annular outer portion inclined axially and radially inwardly from the outer edge of said annular outer portion, said outer edge being seated in said groove for retaining the cover on said annular flange, said annular outer portion having a plurality of slots extending radially inwardly through said edge and terminating in generally round openings, the diameter of each opening being greater than the width of its associated slot, the resilient properties of said annular outer portion being such that said edge can be constricted so that the slots are substantially closed and on release of the constricting forces the edge will spring back to its original unstressed shape, the cumulative circumferential extent of said slots being such that when the slots are closed by constriction, the diameter of said edge will approximate the radially inner diameter of the inwardly facing groove, said edge having a circumferentially extending notch at each of said slots for receiving a pry-off tool, each said notch having a greater circumferential dimension than its associated slot.

24. The wheel structure as claimed in claim 6 wherein said annular flange comprises the terminal flange of a tire rim.

25. The wheel structure as claimed in claim 6 wherein said annular flange comprises the intermediate axial flange of a drop-center type rim.

References Cited by the Examiner
UNITED STATES PATENTS

| | | | |
|---|---|---|---|
| 2,127,600 | 8/38 | Hunt | 301—37 |
| 2,279,334 | 4/42 | Lyon | 301—37 |
| 2,624,636 | 1/53 | Lyon | 301—37 |
| 2,760,606 | 8/56 | Lyon | 301—37 |
| 2,937,048 | 5/60 | Hurd | 301—37 |
| 2,963,318 | 12/60 | Lyon | 301—37 |
| 3,027,199 | 3/62 | Lyon | 301—37 |

FOREIGN PATENTS

| | | |
|---|---|---|
| 550,188 | 12/57 | Canada. |
| 798,159 | 7/58 | Great Britain. |

ARTHUR L. LA POINT, *Primary Examiner.*